US010936941B2

(12) United States Patent
Li et al.

(10) Patent No.: US 10,936,941 B2
(45) Date of Patent: Mar. 2, 2021

(54) EFFICIENT DATA ACCESS CONTROL DEVICE FOR NEURAL NETWORK HARDWARE ACCELERATION SYSTEM

(71) Applicant: XILINX, INC.

(72) Inventors: Yubin Li, Beijing (CN); Song Han, Beijing (CN); Yi Shan, Beijing (CN)

(73) Assignee: XILINX, INC., San Jose, CA (US)

( * ) Notice: Subject to any disclaimer, the term of this patent is extended or adjusted under 35 U.S.C. 154(b) by 1101 days.

(21) Appl. No.: 15/390,573

(22) Filed: Dec. 26, 2016

(65) Prior Publication Data

US 2018/0046905 A1 Feb. 15, 2018

Related U.S. Application Data

(63) Continuation-in-part of application No. 15/242,624, filed on Aug. 22, 2016, and a continuation-in-part of
(Continued)

(30) Foreign Application Priority Data

Aug. 12, 2016 (CN) .......................... 201610663201.9
Aug. 12, 2016 (CN) .......................... 201610663563.8
Dec. 5, 2016 (CN) .......................... 201611105491.1

(51) Int. Cl.
*G06N 3/063* (2006.01)
*G06N 3/04* (2006.01)
(Continued)

(52) U.S. Cl.
CPC ........... *G06N 3/063* (2013.01); *G06N 3/0454* (2013.01); *G06F 7/501* (2013.01); *G06F 7/523* (2013.01);
(Continued)

(58) Field of Classification Search
CPC ........ G06F 7/501; G06F 7/523; G06F 7/5443; G06F 2207/4824; G06N 3/0445;
(Continued)

(56) References Cited

U.S. PATENT DOCUMENTS 9,317,482 B2 4/2016 Davis et al.
2011/0106546 A1* 5/2011 Fejzo .................... G10L 19/008
704/501

FOREIGN PATENT DOCUMENTS

CN 102129397 A 7/2011
CN 104915322 A 9/2015
(Continued)

OTHER PUBLICATIONS

Jiantao Qiu et al., Going Deeper with Embedded FPGA Platform for Convolutional Neural Network, FPGA16 Proceedings of the 2016 ACM/SIGDA International Symposium on Field-Programmable Gate Arrays, Feb. 29, 2016.
(Continued)

*Primary Examiner* — Shane D Woolwine
(74) *Attorney, Agent, or Firm* — IPro, PLLC (57) ABSTRACT

The technical disclosure relates to artificial neural network. In particular, the technical disclosure relates to how to implement efficient data access control in the neural network hardware acceleration system. Specifically, it proposes an overall design of a device that can process data receiving, bit-width transformation and data storing. By employing the technical disclosure, neural network hardware acceleration system can avoid the data access process becomes the bottleneck in neural network computation.

17 Claims, 5 Drawing Sheets

Related U.S. Application Data application No. 15/242,622, filed on Aug. 22, 2016, now Pat. No. 10,621,486.

(51) Int. Cl.
*G06F 7/501* (2006.01)
*G06F 7/523* (2006.01)
*G06F 7/544* (2006.01)

(52) U.S. Cl.
CPC .... *G06F 7/5443* (2013.01); *G06F 2207/4824* (2013.01); *G06N 3/0445* (2013.01)

(58) Field of Classification Search
CPC ...... G06N 3/0454; G06N 3/063; G06N 20/00; G06N 20/10; G06N 20/20; G06N 3/06
USPC ...................................................... 706/15, 41
See application file for complete search history.

(56) References Cited

FOREIGN PATENT DOCUMENTS

| CN | 105488565 | A | 4/2016 |
|---|---|---|---|
| CN | 205139973 | U | 4/2016 |
| CN | 105681628 | A | 6/2016 |
| CN | 105760933 | A | 7/2016 |

OTHER PUBLICATIONS

Going Deeper with Embedded FPGA Platform for Convolutional Neural Network, DOI: 10.1145/2847263.2847265.
1. Image-Net Large-Scale Vision Recognition Challenge (ILSVRC) 2012.
15. Long short-term memory recurrent neural network architectures for large scale acoustic modeling[C]// INTERSPEECH. 2014: 338-342.
16. Long short-term memory based recurrent neural network architectures for large vocabulary speech recognition[J]. arXiv preprint arXiv:1402.1128, 2014.
18. Deep compression: Compressing deep neural networks with pruning, trained quantization and Huffman coding.
19. Diannao: A small-footprint high-throughput accelerator for ubiquitous machine-learning.
21. Dadiannao: A machine-learning supercomputer.
22. Shidiannao: shifting vision processing closer to the sensor.
23. DSD: Regularizing Deep Neural Networks with Dense-Sparse-Dense Training Flow in NIPS 2016.
Learning both Weights and Connections for Efficient Neural Networks, arXiv:1506.02626v3 [cs.NE] Oct. 30, 2015.
2. Reconfigurable pipelined 2-d convolvers for fast digital signal processing.
12. A dynamically configurable coprocessor for convolutional neural networks.
3. Second order derivatives for network pruning: Optimal brain surgeon.
5. Cnp: An fpga-based processor for convolutional networks.
6. Optimizing fpga-based accelerator design for deep convolutional neural networks.
7. Pudiannao: A polyvalent machine learning accelerator.
8. DSD: Regularizing Deep Neural Networks with Dense-Sparse-Dense Training Flow in NIPS 2016.
9. Long Short-term Memory, Neural Computation 9(8):1735-80 • Dec. 1997, DOI: 10.1162/neco.1997.9.8.1735.
A Massively Parallel Coprocessor for Convolutional Neural Networks, DOI: 10.1109/ASAP.2009.25.
NeuFlow: Dataflow vision processing system-on-a-chip, DOI: 10.1109/MWSCAS.2012.6292202.

\* cited by examiner

Xi denotes vectors that are sent to Thread i

Fig. 7

Yi denotes computation results that are obtained from Thread i

Fig. 8

…

EFFICIENT DATA ACCESS CONTROL DEVICE FOR NEURAL NETWORK HARDWARE ACCELERATION SYSTEM

CROSS REFERENCE TO RELATED APPLICATIONS

This application claims priority to Chinese Patent Application Number 201610663201.9 filed on Aug. 12, 2016, Chinese Patent Application Number 201610663563.8 filed on Aug. 12, 2016, Chinese Patent Application Number 201611105491.1 filed on Dec. 5, 2016, U.S. application Ser. No. 15/242,622 filed on Aug. 22, 2016, U.S. application Ser. No. 15/242,624 filed on August 22, the entire content of which are incorporated herein by reference.

TECHNICAL FIELD

The technical disclosure relates to artificial neural network. In particular, the technical disclosure relates to how to implement efficient data access and transfer in a neural network hardware acceleration system.

BACKGROUND ART

Introduction to ANN

Artificial neural networks (ANNs), also called NNs, is a distributed parallel information processing model which absorbs the animal's neural network behavior characteristics. In recent years, study of ANN achieved fast developments, and it has been widely applied in various fields, such as image recognition, speech recognition, natural language processing, weather forecasting, gene expression, contents pushing, etc.

Take CNN (convolutional neural network) for example. CNN has achieved the best performance in extensive tasks related to computer vision. A typical CNN consists of a number of layers that run in sequence.

The parameters of a CNN model are called "weights". The first layer of a CNN reads an input image and outputs a series of feature maps. The following layers read the feature maps generated by previous layers and output new feature maps. Finally, a classifier outputs the probability of each category that the input image might belong to.

CONV layer (convolutional layer) and FC layer (fully connected layer) are two essential types of layer in CNN. After CONV layers, there are usually pooling layers.

For a CNN layer, $f_j^{in}$ denotes its j-th input feature map, $f_i^{out}$ denotes the i-th output feature map, and $b_i$ denotes the bias term to the i-th output map.

For CONV layers, $n_{in}$ and $n_{out}$ represent the number of input and output feature maps respectively.

For FC layers, $n_{in}$ and $n_{out}$ are the length of the input and output feature vector.

A CONV layer takes a series of feature maps as input and convolves with convolutional kernels to obtain the output feature map.

A nonlinear layer, which applies nonlinear activation function to each element in the output feature maps is often attached to CONV layers.

The CONV layer can be expressed with Equation 1:

$$f_i^{out}=\sum_{j=1}^{n_{in}} f_j^{in} \otimes g_{i,j}+b_i (1 \leq i \leq n_{out}) \quad (1)$$

where $g_{i,j}$ is the convolutional kernel applied to j-th input feature map and i-th output feature map.

FC layer applies a linear transformation on the input feature vector:

$$f^{out}=Wf^{in}+b \quad (2)$$

where W is an $n_{out} \times n_{in}$ transformation matrix and b is the bias term. It should be noted, for the FC layer, the input is not a combination of several 2-D feature maps but just a feature vector. Consequently, in Equation 2, the parameter $n_{in}$ and $n_{out}$ actually corresponds to the lengths of the input and output feature vector.

Pooling layer, which outputs the maximum or average value of each subarea in each feature maps, is often attached to the CONV layer. Max-pooling can be expressed as Equation 3:

$$f_{i,j}^{out} = \max_{p \times p} \begin{pmatrix} f_{m,n}^{in} & \cdots & f_{m,n+p-1}^{in} \\ \vdots & & \vdots \\ f_{m+p-1,n}^{in} & \cdots & f_{m+p-1,n+p-1}^{in} \end{pmatrix} \quad (3)$$

where p is the pooling kernel size. This non-linear "down sampling" not only reduces the feature map size and the computation for later layers, but also provides a form of translation invariance.

In a CNN, since FC layers contribute to most of memory footprint, it is necessary to reduce weights of FC layers while maintaining comparable accuracy. For example, SVD is adopted for accelerating FC layers. Considering an FC layer $f^{out}=Wf^{in}+b$, the weight matrix W can be decomposed as $W \approx U_d S_d V_d = W_1 W_2$, in which $S_d$ is a diagonal matrix. By choosing the first d singular values in SVD, i.e. the rank of matrix $U_d$, $S_d$, and $V_d$, both time and space complexity can be reduced to $O(d \cdot n_{in}+d \cdot n_{out})$ from $O(n_{in} \cdot n_{out})$. Since accuracy loss may be minute even when d is much smaller than $n_{in}$ and $n_{out}$, considerable reduction of time consumption and memory footprint can be achieved.

However, the scale of ANNs is exploding due to fast developments in recent years. Certain disclosed advanced ANN model might have hundreds of layers and billions of connections, and the implementation thereof is both calculation-centric and memory-centric. In conventional solutions, ANNs are commonly implemented by employing general purpose processors (CPU) or Graphic Processing Units (GPU). Due to the sequentiality of program instructions, those solutions cannot fully exploit the potential parallel capability of ANNs therefore limits the computation speed. In addition, employing CPU or GPU is also energy-consuming. In order to address the above difficulties, FPGA-based or ASIC-based neural network hardware acceleration systems have recently been proposed. The challenge is that, with the increase of computation parallelism, the bandwidth requirement for data access is also increasing.

Figure 1:
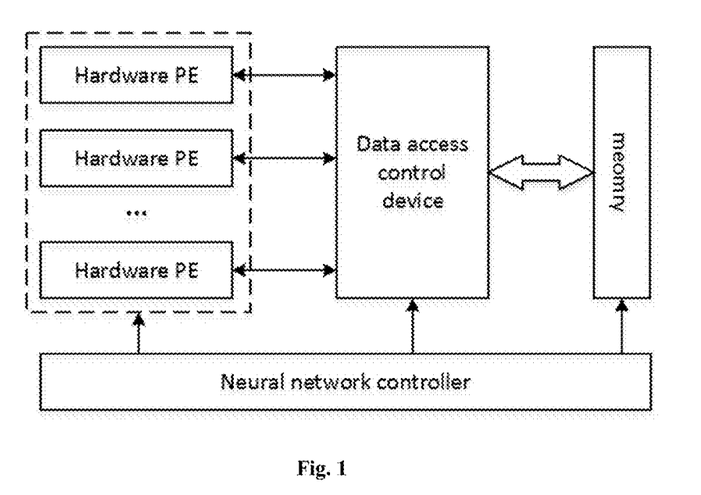
FIG. 1 shows the architecture of a neural network hardware acceleration system.

FIG. 1 shows the architecture of a neural network acceleration system.

As shown in FIG. 1, a neural network acceleration system comprises: a plurality of hardware processing elements (PEs), a data access control device, a memory and a neural network controller.

In FIG. 1, the neural network controller is in charge of global control. The memory stores data used for neural network computation and computation results. According to instructions from neural network controller, the hardware processing elements read data from the memory, conduct the corresponding calculation and then send the result data back to the memory.

In data access control device in this technical disclosure locates between the hardware processing elements and the memory. The device is used to perform data transmission between the hardware processing elements and the memory.

Encoding a Sparse ANN

For a sparse ANN, which is typically obtained after being compressed, it is desired to encode the matrix of said ANN in order to further reduce the memory requirements. It has been proposed to encode and store sparse matrix by Compressed Row Storage (CRS) or Compressed Column Storage (CCS).

In the present application, in order to exploit the sparsity of compressed neural network, it might encode and store the weight matrix W in a variation of compressed column storage (CCS) format.

For each column $W_j$ of matrix W, it stores a vector v that contains the non-zero weights, and a second, equal-length vector z. Vector z encodes the number of zeros before the corresponding entry in v. Each entry of v and z is represented by a four-bit value. If more than 15 zeros appear before a non-zero entry we add a zero in vector v.

For example, it encodes the following column [0,0,1,2,0,0,0,0,0,0,0,0,0,0,0,0,0,0,0,3], as v=[1,2,0,3],z=[2,0,15,2].

v and z of all columns are stored in one large pair of arrays with a pointer vector p pointing to the beginning of the vector for each column. A final entry in p points one beyond the last vector element so that the number of non-zeros in column j (including padded zeros) is given by $p_{j+1}-p_j$.

Storing the sparse matrix by CCS format makes it easy to exploit matrix sparsity. It simply multiplies each non-zero activation by all of the non-zero elements in its corresponding column.

U.S. Pat. No. 9,217,482 titled "UNIVERSAL FPGA/ASIC MATRIX-VECTOR MULTIPLICATION ARCHITECTURE" (filed on Oct. 14, 2012) disclosed how to implement Compressed Sparse Row (CSR) based on CPU and GPU solution, where Compressed Variable Length Bit Vector (CVBV) format is also employed. CVBC is another method for neural network compression.

In the above prior patent literature, it proposes a hardware-optimized sparse matrix representation, referred to herein as the Compressed Variable-Length Bit Vector (CVBV) format, which is used to take advantage of the capabilities of FPGAs and reduce storage and bandwidth requirements across the matrices compared to that typically achieved when using the Compressed Sparse Row (CSR) format in typical CPU- and GPU-based approaches. Also disclosed is a class of sparse matrix formats that are better suited for FPGA implementations than existing formats reducing storage and bandwidth requirements. A partitioned CVBV format is described to enable parallel decoding."

Previous Research Product of the Inventors: Parallel Processing Neural Network by Employing EIE Regarding to the PEs in FIG. 1, one of the co-inventors of the technical disclosure has proposed and disclosed an Efficient Inference Engine (EIE, Efficient Inference Engine on Compressed Deep Neural Network). For a better understanding of the technical disclosure, the EIE solution is briefly introduced here.

Figure 2:
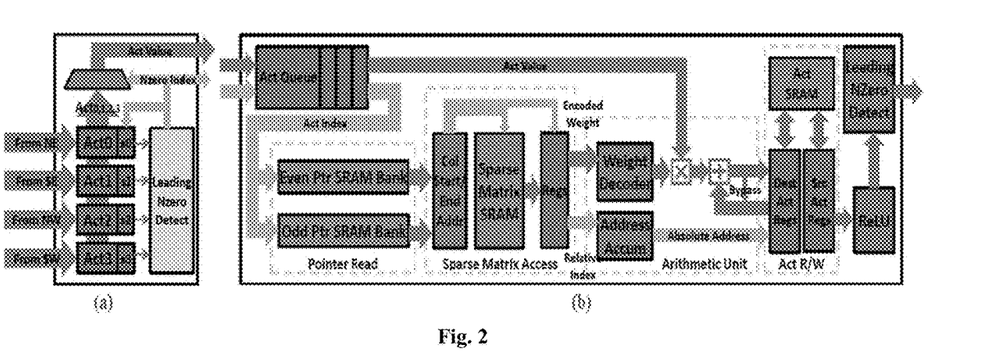
FIG. 2 shows the hardware design of an efficient inference engine on compressed deep neural network.

FIG. 2 shows the architecture of Efficient Inference Engine (EIE) that applies to compressed neural network model in machine learning, especially for the compressed neural network model stored in the above CCS or CRS format.

A Central Control Unit (CCU) controls an array of PEs that each computes one slice of the compressed network. The CCU also receives non-zero input activations from a distributed leading nonzero detection network and broadcasts these to the PEs.

Almost all computation in EIE is local to the PEs except for the collection of non-zero input activations that are broadcast to all PEs. However, the timing of the activation collection and broadcast is non-critical as most PEs take many cycles to consume each input activation.

Activation Queue and Load Balancing

Non-zero elements of the input activation vector $a_j$ and their corresponding index j are broadcast by the CCU to an activation queue in each PE. The broadcast is disabled if any PE has a full queue. At any point in time each PE processes the activation at the head of its queue.

The activation queue allows each PE to build up a backlog of work to even out load imbalance that may arise because the number of non-zeros in a given column j may vary from PE to PE.

Pointer Read Unit

The index j of the entry at the head of the activation queue is used to look up the start and end pointers $p_j$ and $p_{j+1}$ for the v and x arrays for column j. To allow both pointers to be read in one cycle using single-ported SRAM arrays, we store pointers in two SRAM banks and use the LSB of the address to select between banks. $p_j$ and $p_{j+1}$ will always be in different banks. EIE pointers are 16-bits in length.

Sparse Matrix Read Unit

The sparse-matrix read unit uses pointers $p_j$ and $p_{j+1}$ to read the non-zero elements (if any) of this PE's slice of column $I_j$ from the sparse-matrix SRAM. Each entry in the SRAM is 8-bits in length and contains one 4-bit element of v and one 4-bit element of x.

For efficiency the PE's slice of encoded sparse matrix I is stored in a 64-bit-wide SRAM. Thus eight entries are fetched on each SRAM read. The high 13 bits of the current pointer p selects an SRAM row, and the low 3-bits select one of the eight entries in that row. A single (v, x) entry is provided to the arithmetic unit each cycle.

Arithmetic Unit

The arithmetic unit receives a (v, x) entry from the sparse matrix read unit and performs the multiply accumulate operation $b_x=b_x+v\times a_j$. Index x is used to index an accumulator array (the destination activation registers) while v is multiplied by the activation value at the head of the activation queue. Because v is stored in 4-bit encoded form, it is first expanded to a 16-bit fixed-point number via a table look up. A bypass path is provided to route the output of the adder to its input if the same accumulator is selected on two adjacent cycles.

Activation Read/Write

The Activation Read/Write Unit contains two activation register files that accommodate the source and destination activation values respectively during a single round of FC layer computation. The source and destination register files exchange their role for next layer. Thus no additional data transfer is needed to support multilayer feed-forward computation.

Each activation register file holds 64 16-bit activations. This is sufficient to accommodate 4K activation vectors across 64 PEs. Longer activation vectors can be accommodated with the 2KB activation SRAM. When the activation vector has a length greater than 4K, the M×V will be completed in several batches, where each batch is of length 4K or less. All the local reduction is done in the register, and SRAM is read only at the beginning and written at the end of the batch.

Distributed Leading Non-Zero Detection

Input activations are hierarchically distributed to each PE. To take advantage of the input vector sparsity, we use leading non-zero detection logic to select the first positive result. Each group of 4 PEs does a local leading non-zero detection on input activation. The result is sent to a Leading Non-Zero Detection Node (LNZD Node) illustrated in FIG. 2. Four of LNZD Nodes find the next non-zero activation and sends the result up the LNZD Node quadtree. That way the wiring would not increase as we add PEs. At the root LNZD Node, the positive activation is broadcast back to all the PEs via a separate wire placed in an H-tree.

Central Control Unit

The Central Control Unit (CCU) is the root LNZD Node. It communicates with the master such as CPU and monitors the state of every PE by setting the control registers. There are two modes in the Central Unit: I/O and Computing.

In the I/O mode, all of the PEs are idle while the activations and weights in every PE can be accessed by a DMA connected with the Central Unit.

In the Computing mode, the CCU will keep collecting and sending the values from source activation banks in sequential order until the input length is exceeded. By setting the input length and starting address of pointer array, EIE will be instructed to execute different layers.

Customized neural network hardware like EIE (FIG. 2) accelerates computation of PEs in neural network. On the other hand, it brings new challenges, too. Faster PEs need memory to provide parameters and other data at a higher speed, otherwise there will be problems such as computation interruption and result loss.

In customized hardware such as EIE solution, the memory print of the Pointer Vector increases linearly as the number of PEs increases. If 512 PEs are employed, the number of memory units require by EIE solution will grow up to 512*2=1024. At the same time, as the number of PEs increases, the number of storage tables required by weight decoding modules will also increase linearly. For example, 512 storage tables will be required by 512 PEs. When employing customized chips, both of the above defects will become a big challenge with the increasing of PEs.

The design in FIG. 2 mainly concerns PEs in FIG. 1. The present technical disclosure further proposes a hardware design between PEs and the memory. Specifically, the technical disclosure proposes an efficient data access control device for neural network hardware acceleration system, which provides parameters and input matrices for PEs and stores the results of computation in a more efficiently way.

SUMMARY

In the technical disclosure, we propose a data access control device for a neural network acceleration system, comprising: a parameter access control circuit, configured to read parameters required by processing elements (PEs) from a memory, and perform bit-width transformation operation on said parameters and output the transformed parameters to said PEs; a vector access control circuit, configured to read vectors required by PEs from the memory, perform bit-width transformation operation on said vectors and output the transformed vectors to said PEs; a computation result access control circuit, configured to read computation results from said PEs, perform bit-width transformation operation on said computation results and output the transformed computation results to the memory.

Further, said parameter access control circuit comprises: at least one parameter buffer, configured to store received parameters; and at least one bit-width converters, configured to perform bit-width transformation operation on said parameters.

Further, the number of said bit-width converters in each circuit is no less than m×n÷d, wherein m is the number of PEs, n is the number of parameters to be processed or to be output by one PE per computation cycle, and the computation delay is d.

Further, said bit-width converter is implemented by using two cascaded asynchronous FIFOs, one is 512 bit-to-64 bit and the other is 64 bit-to-16 bit.

Further, said parameters comprises at least weight, bias, diagnose matrix data of said neural network.

In another aspect of this technical disclosure, we propose a data access control device used for a neural network acceleration system, comprising: first memory configured for storing weight data of the neural network; second memory configured for storing input vectors, bias data of the neural network; first memory controller configured for reading the weight data from the first memory and outputting said weight data to a plurality of processing elements (PEs); second memory controller configured for reading the input vectors and bias data from the second memory, conducting bit-width conversion on the input vectors and bias data, and outputting said converted input vectors and bias data to the processing elements.

Further, said second memory controller comprising at least one bit-width converter, configured to perform bit-width transformation operation.

Further, said second memory controller further comprising a computation result access control circuit, configured to read computation results from said PEs, perform bit-width conversion operation on said computation results and output the transformed computation results to the first memory.

Further, said bit-width converter is implemented by two cascaded asynchronous FIFOs, one is a 512 bit-to-64 bit converter and the other is 64 bit-to-16 bit to converter.

Further, the number of said bit-width converters is no less than m×n÷d, wherein m is the number of said PEs, n is the number of data to be processed by one PE per computation cycle, and d is the computation delay.

EMBODIMENTS OF THE INVENTION

The purpose of the present disclosure is to propose an efficient data access control device for neural network hardware acceleration system. Said data access control device provides data for high-performance processing elements (PEs) at a higher speed and stores the results of computation.

Figure 3:
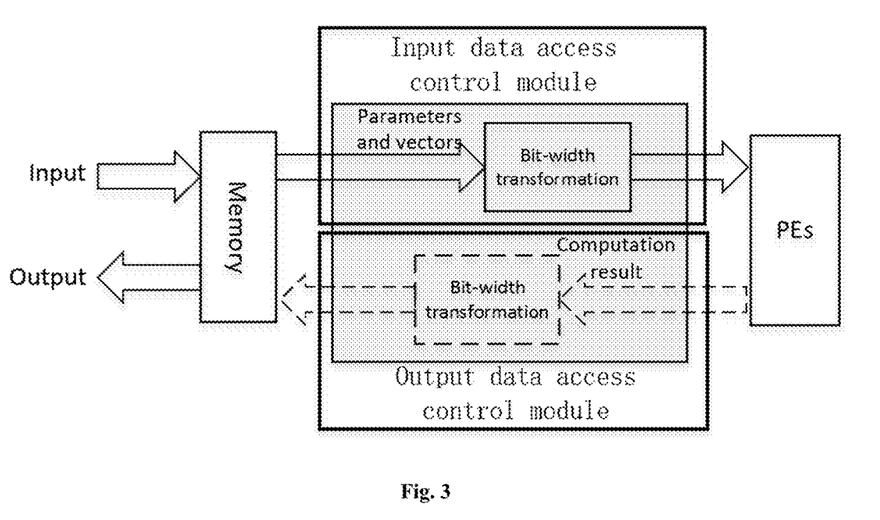
FIG. 3 shows an example of the data access control device according to the present disclosure.

FIG. 3 shows the deployment of said data access control device. The data access control device receives parameters and vectors from memory and output them to PEs. On the other hand, the device also receives computation results from PEs and output them to memory.

The data access control device in FIG. 3 comprises access control module for input data and access control module for output data. Said input data include parameter and vector. Said output data is computation result. Said device is deployed between memory and PEs.

In neural network hardware acceleration system, usually the memory bandwidth is relatively large (e.g. DDR memory of 512-bit width) while the bit-width required by PEs is relevantly small (e.g. 16-bit). Therefore, the main task for bit-width transformation operation is to split the large bit-width data read from memory into a plurality of small bit-width data and transmit the split data, or to assemble a plurality of small bit-width data into a single large bit-width data and transmit the assembled data.

In one embodiment according to the present disclosure, a data access control device in neural network hardware acceleration system comprises: a parameter access control circuit, a vector access control circuit, a computation result access control circuit and a control circuit.

Said control circuit is in charge of directing data float, that is, it decides the objective PE for input data and objective bit-width converter for computation results.

Figure 4:
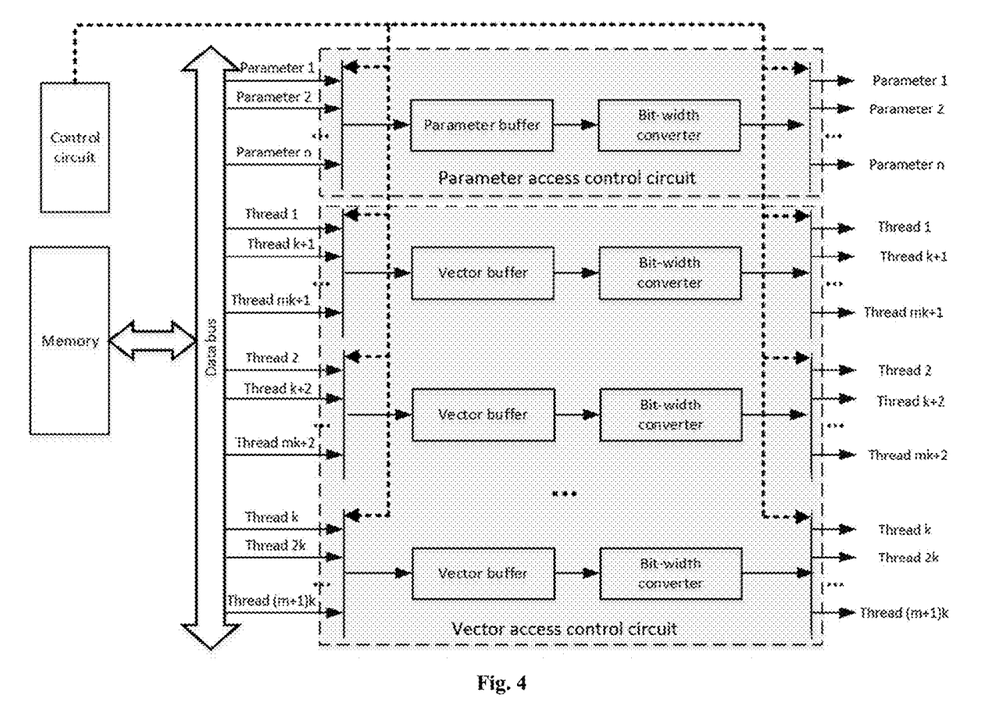
FIG. 4 shows the design of parameter access control circuit and vector access control circuit in one embodiment according to the present disclosure.

FIG. 4 shows a detail embodiment of parameter access control circuit and vector access control circuit. The dashed lines in FIG. 4 represent control signal that is used to direct data float.

Said parameter access control circuit reads parameters from memory. The parameters are required by PEs and are at the same bit-width as memory's bandwidth. The parameters need to go through bit-width transformation operation before sent to PEs.

The types of said parameters may be different according to the type of the neural network and the requirement of PEs. For example, as mentioned in Background Art, the related parameters may include weight values, bias and diagonal matrix. If the neural network is in a compressed format, the parameters also include pointers.

As shown in FIG. 4, said parameter access control circuit comprises bit-width converter. Said bit-width converter performs bit-width transformation operation on input parameters. The objective bit-width is according to the requirements of PEs.

Said vector access control circuit reads vectors from memory. The vectors are required by PEs and are at the same bit-width as memory's bandwidth. The vectors need to go through bit-width transformation operation before sent to PEs.

As shown in FIG. 4, said vector access control circuit comprises bit-width converter. Said bit-width converter performs bit-width transformation operation on input vectors. The objective bit-width is according to the requirements of PEs.

In another embodiment according to the present disclosure, further, said parameter access control circuit and vector access control circuit comprise parameter buffer and vector buffer respectively. The parameter buffer and vector buffer read parameters and vectors from memory continually, and then output them to bit-width converter. Such design can reduce the time consumption in memory reading.

In another embodiment according to the present disclosure, further, there are multiple bit-width converters for parameters and vectors. Such design can fully exploit the usage of memory bandwidth and PEs' parallel computation capability. The number of bit-width converters can be determined using the following method:

assuming m is the number of PEs, n is the number of input data (parameter or vector) to be processed by one PE per computation, and d is the computation delay (clocks between two computations), then the number of bit-width converters should be no less than m×n÷d.

Figure 5:
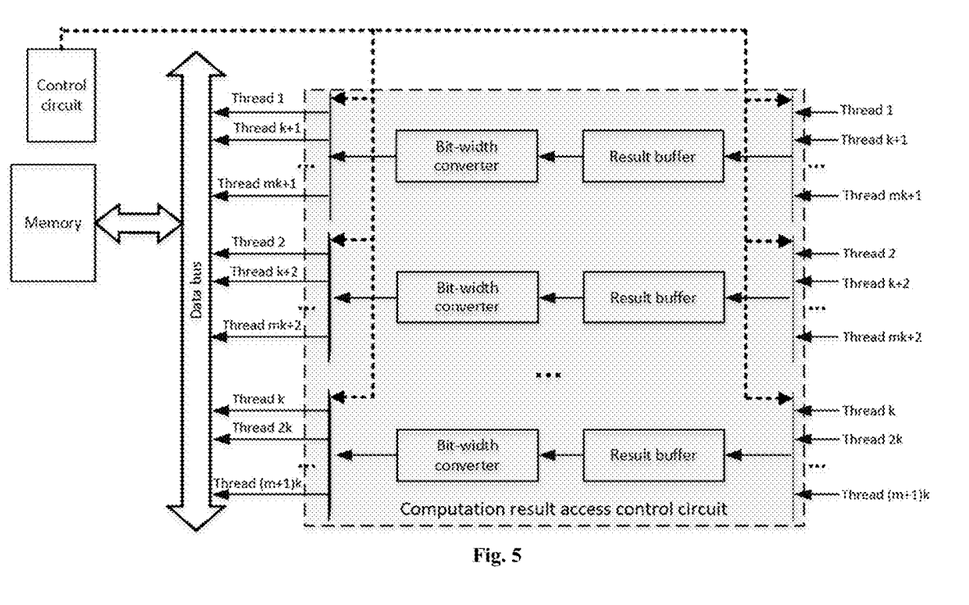
FIG. 5 shows the design of computation result access control circuit in one embodiment according to the present disclosure.

FIG. 5 shows the computation result access control circuit. The dashed line in FIG. 5 represent control signal that is used to direct data float.

Said computation result access control circuit reads data from PE at the same bit-width as computation's requirement. After bit-width transformation, the computation results are sent to memory.

Said computation result access control circuit comprises bit-width converter that perform bit-width transformation on computation result. The objective bit-width is the same as the memory's bandwidth.

Further, said computation result access control circuit comprises corresponding result buffer. Said result buffer reads computation result from PEs and outputs them to said bit-width converter. Such design can speed up result reading and avoid results being covered by the next result and getting lost.

Further, the number of bit-width converter can be determined using the following method: assuming m is the number of PEs, n is the number of result vector output by one PE per computation, and d is the computation delay (clocks between two computation), then the number of bit-width converters should be no less than m×n÷d.

Example

Figure 6:
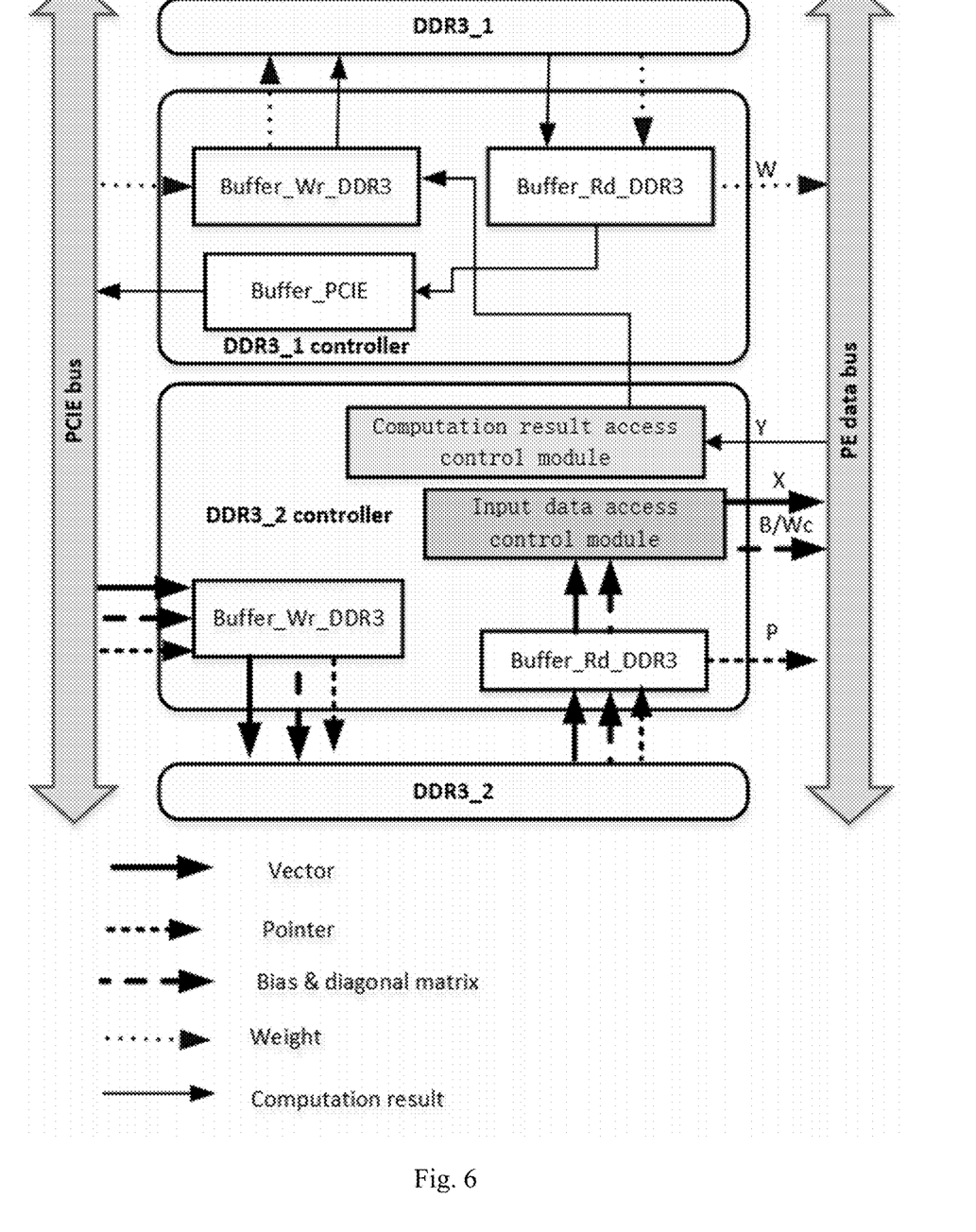
FIG. 6 shows one embodiment of the present disclosure deployed in a neural network hardware acceleration system based on FPGA.

FIG. 6 illustrates one of the technical disclosure's embodiment which is deployed in neural network acceleration system based on FPGA.

The system in FIG. 6 comprises PCIE bus, 2 off-chip memories (DDR3_1 and DDR3_2), DDR_1 controller, DDR_2 controller and PE data bus.

Due to the immense volume of neural network's weight data, in this embodiment, input weight data processing is designed to be conducted by DDR3_1 and DDR3_1 controller, while processing of other parameters and vectors is conducted by DDR3_2 and DDR3_2 controller.

The read and write bandwidth of the two off-chip DDR3 memories are 512-bit.

The acceleration system comprises 32 parallel PEs. PEs require vectors at 16-bit width, bias and diagonal matrix data at 16-bit width, pointer and weight data at 512-bit width. The computation result flow of the PEs is at 16-bit width.

As the bit-width of pointer and weight data read from memories meets the requirement of PEs, they do not to go through bit-width transformation operation. Therefore, in the acceleration system shown in FIG. 6, data that need to be transformed are vector, bias and diagonal matrix data as well as computation results.

DDR3_1 controller comprises: Buffer_Wr_DDR3, Buffer_Rd_DDR3, Buffer_PCIE.

DDR3_2 controller comprises: computation result access control module, input data access control module, Buffer_Wr_DDR3 and Buffer_Rd_DDR3.

Said Buffer_PCIE, Buffer_Wr_DDR3 and Buffer_Rd_DDR3 are all asynchronous FIFOs, which are used for asynchronous clock domains processing in data reading and writing.

In FIG. 6, different types of data flow are represented in different types of arrow lines, including: input vector, pointer, bias & diagonal matrix, weight data and computation result The input data are sent from CPU (which controls neural network software and is not shown in the figures) to FPGA via PCIE and the results return to CPU also via PCIE.

Weight data are read from PCIE and temporally stored in DDR3_1. When the PEs request for weight data, since there is no need for bit-width transformation in this embodiment, weight data will be directly sent to PEs via PE data bus. In the present embodiment, DDR3_1 is specifically assigned for weight data, as the volume thereof is extensive.

Pointer, vector, bias and diagonal matrix are read from PCIE and temporally stored in DDR3_2. When PEs request for vector, bias or diagonal matrix data, since these data need bit-width transformation, the control circuit will direct these data to be input into an input data access control module. After bit-width transformation, vector, bias or diagonal matrix data are sent to PEs via PE data bus. When PEs request for pointer data, since there is no need for bit-width transformation, pointer data will be directly sent to PEs via PE data bus.

Correspondingly, in FIG. 6, the input data access control module further comprises a vector access control circuit and a parameter access control circuit.

Figure 7:
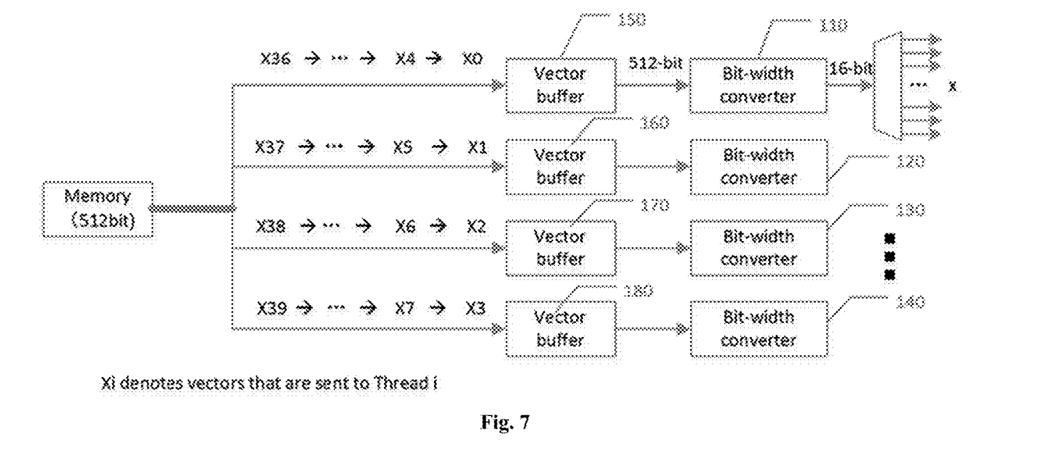
FIG. 7 shows one embodiment of vector access control circuit according to the present disclosure.

FIG. 7 further shows an example of the vector access control circuit comprised in the input data access control module shown in FIG. 6.

In the circuit design as shown in FIG. 7, the bit-width converters 110, 120, 130, 140 is used to split 512-bit data into 32 16-bit vectors respectively and sends them to the PEs.

Sequentially, the vectors required by thread 0, thread 1, thread 2 etc. are read from memory, stored in different vector buffers 150, 160, 170, 180 using distributed storage strategy, processed in parallel by bit-width converters 110, 120, 130, 140 respectively and finally sent to the PEs.

In FIG. 7, Xi denotes data required by thread i.

The bit-width converters in FIG. 7 may be implemented by using two cascaded asynchronous FIFOs, one is 512-to-64 bit and the other is 64-to-16 bit.

The design of parameter access control circuit (not shown in figures) of FIG. 6 is similar to the vector access control circuit in FIG. 7.

Figure 8:
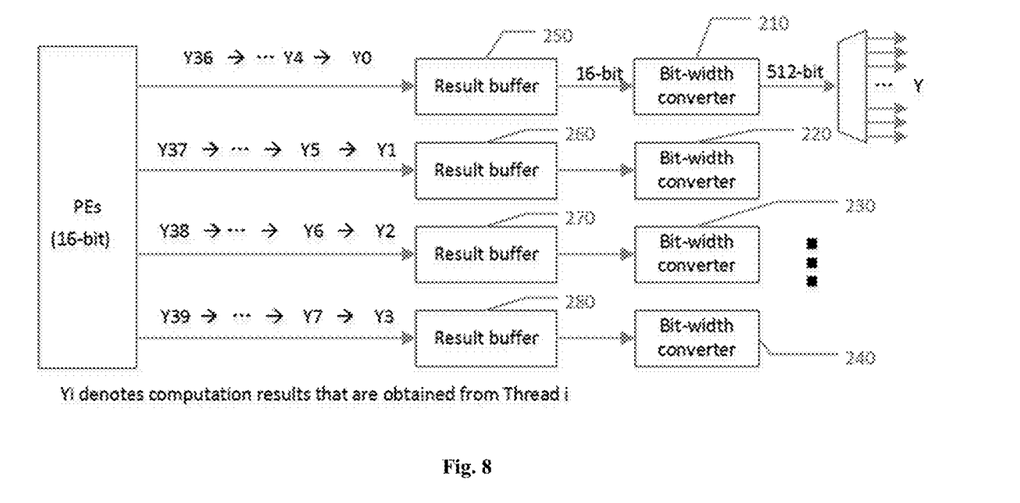
FIG. 8 shows one embodiment of computation result access control circuit according to the present disclosure.

FIG. 8 shows an example of the computation result access control circuit of the system shown in FIG. 6.

As shown in FIG. 8, the result buffers 250, 260, 270, 280 read computation result from PEs and send them to corresponding bit-width converters 210, 220, 230, 240. Bit-width converters 210, 220, 230, 240 respectively assemble 32-bit computation results into a 512-bitwidth data and stored it in memory.

In FIG. 8, the bit-width converters 210, 220, 230, 240 may be implemented by using an array of 32 16-bit registers. When a 16-bit data is input, register address increases by 1. After 32 16-bit data have been input, it outputs a 512-bit data.

Beneficial Technical Effects

The present disclosure aims to improve data access, which already becomes the bottleneck in neural network computation. To achieve this goal, the present disclosure reduces the time for data preparatory mainly by parallelizing input data processing;

The present disclosure also aims to avoid that computation results occupy PEs' on-chip memory for a long time, which helps to overcome problems such as computation interruption or result loss and increase the stability of the system. By providing multiple threads sharing one bit-width transformation circuit, it helps reduce the occupation of on-chip memory and increases the efficiency of resource utilization while satisfying the requirements of computation bandwidth.

Those skilled in the art may understand and implement other variations to the disclosed embodiments from a study of the drawings, the present application, and the appended claims.

In the claims, the word "comprising" does not exclude other elements or steps, and the indefinite article "a" or "an" does not exclude a plurality.

In applications according to present application, one element may perform functions of several technical feature recited in claims.

Any reference signs in the claims should not be construed as limiting the scope. The scope and spirit of the present application is defined by the appended claims.

What is claimed is:

1. A data access control device used for a neural network acceleration system, comprising:
   a parameter access control circuit, configured to read parameters required by a plurality of processing elements (PEs) from a memory, and perform bit-width transformation operation on said parameters and output the transformed parameters to said PEs;
   a vector access control circuit, configured to read vectors required by PEs from the memory, perform bit-width transformation operation on said vectors and output the transformed vectors to said PEs; and
   a computation result access control circuit, configured to read computation results from said PEs, perform bit-width transformation operation on said computation results and output the transformed computation results to the memory,
   wherein the bit-width transformation operation on data comprises, if the data is the parameters or the vectors, splitting data into a plurality of smaller bit width data, and
   wherein the bit-width transformation operation on data comprises, if the data is the computation results, assembling a plurality of small bit-width data into a single large bit-width data.

2. The device of claim 1, wherein said parameter access control circuit further comprises:
   at least one parameter buffer, configured to store received parameters; and
   at least one bit-width converter, configured to perform bit-width transformation operation on said parameters.

3. The device of claim 1, wherein said vector access control circuit further comprises:
   at least one vector buffer, configured to store received vectors; and
   at least one bit-width converter, configured to perform bit-width transformation operation on said vectors.

4. The device of claim 1, wherein said computation result access control circuit further comprises:
   at least one result buffer, configured to store received computation results; and
   at least one bit-width converter, configured to perform bit-width transformation operation on said computation results.

5. The device of any of claims 2-4, wherein the number of bit-width converters is no less than m×n÷d, wherein m is the number of said PEs, n is the number of data to be processed or to be output by one PE per computation cycle, and d is the computation delay.

6. The device of any of claims 2-4, wherein said bit-width converter operation is implemented by two cascaded asynchronous FIFOs, one is a 512 bit-to-64 bit converter and the other is 64 bit-to-16 bit converter.

7. The device of claim 1, wherein said parameters comprises at least weight, bias, diagonal matrix data of said neural network.

8. The data access control device of claim 1,
wherein the parameter access control circuit is configured to output the transformed parameters to each PE of said PEs,
wherein the vector access control circuit is configured to output the transformed vectors to each PE of said PEs, and
wherein the computation result access control circuit is configured to read computation results from each PE of said PEs.

9. The data access control device of claim 8,
wherein the parameter access control circuit is not a part of said PEs, and
wherein the vector access control circuit is not a part of said PEs.

10. The data access control device of claim 1,
wherein the parameter access control circuit is not a part of said PEs, and
wherein the vector access control circuit is not a part of said PEs.

11. A data access control device used for a neural network acceleration system, comprising:
first memory configured for storing weight data of the neural network;
second memory configured for storing input vectors, bias data of the neural network;
first memory controller configured for reading the weight data from the first memory into the first memory controller and outputting said weight data from the first memory controller to a plurality of processing elements (PEs);
second memory controller configured for reading the input vectors and bias data from the second memory into the second memory controller, conducting bit-width transformation operation on the input vectors and bias data, and outputting said transformed input vectors and bias data from the second memory controller to the processing elements.

12. The data access control device of claim 11, wherein the second memory controller further comprising:
at least one bit-width converter, configured to perform bit-width transformation operation.

13. The device of claim 12, wherein said bit-width converter operation is implemented by two cascaded asynchronous FIFOs, one is a 512 bit-to-64 bit converter and the other is 64 bit-to-16 bit converter.

14. The device of claim 12, wherein the number of bit-width converters is no less than m×n÷d, wherein m is the number of said PEs, n is the number of data to be processed or to be output by one PE per computation cycle, and d is the computation delay.

15. The device of claim 11, wherein the second memory controller further comprising:
a computation result access control circuit, configured to read computation results from said PEs, perform bit-width transformation operation on said computation results and output the transformed computation results to the first memory.

16. The data access control device of claim 15, wherein the bit-width transformation operation on data comprises, if the data is the computation results, assembling a plurality of small bit-width data into a single large bit-width data.

17. The data access control device of claim 11, wherein the bit-width transformation operation on data comprises, if the data is the input vectors or the bias data, splitting data into a plurality of smaller bit width data.

* * * * *